Dec. 5, 1961  Q. A. HANSEN  3,011,608
FLUID PRESSURE OPERATED CLUTCH HAVING AN INTEGRAL
AND NON-ROTATABLE CYLINDER AND PISTON ASSEMBLY
Filed Dec. 20, 1960
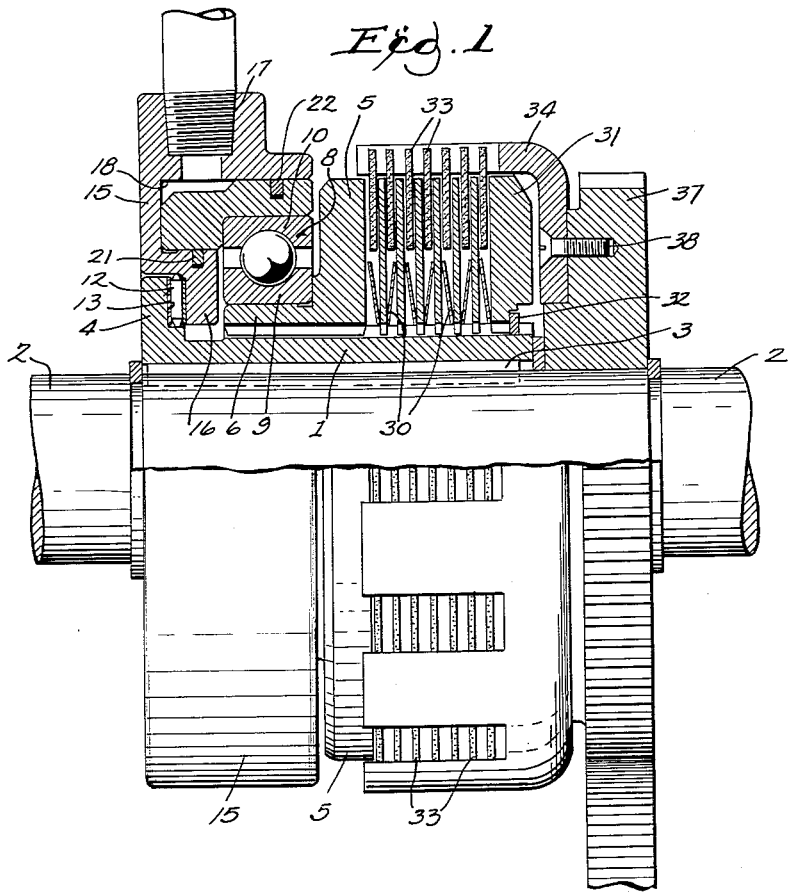
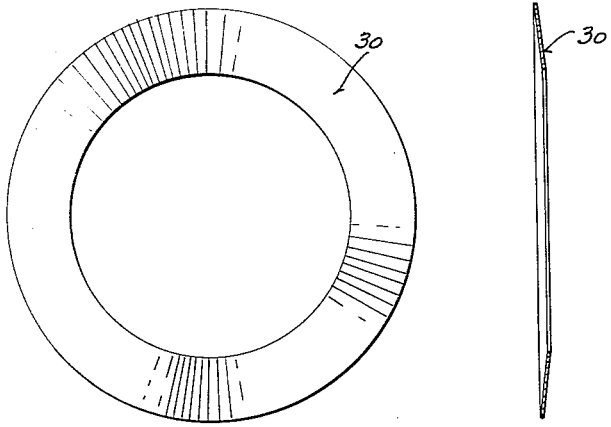
Fig. 2
Fig. 3
INVENTOR.
QUINTEN A. HANSEN
BY
Lieber, Lieber & Nilles
ATTORNEYS

United States Patent Office 3,011,608
Patented Dec. 5, 1961

3,011,608
FLUID PRESSURE OPERATED CLUTCH HAVING AN INTEGRAL AND NON-ROTATABLE CYLINDER AND PISTON ASSEMBLY
Quinten A. Hansen, Highway 38, Franksville, Wis.
Filed Dec. 20, 1960, Ser. No. 77,098
8 Claims. (Cl. 192—85)

This invention relates to clutch mechanisms for imparting axial pressure on and movement to rotating elements such as found in clutches or other machine elements mounted on rotating shafts. More particularly, the invention relates to those clutch mechanisms of the compact, integral type in which the cylinder and piston are non-rotating, require no rotating seals and are supported entirely by one of the co-axially aligned and rotatable members.

Certain prior art fluid-operated clutches have utilized an integral, concentric cylinder and piston assembly which rotates together with the clutch itself. Where the piston and cylinder assembly are thus an integral part of the clutch assembly, all of the forces are self-contained within the clutch assembly. No axial forces are imposed on the shaft or other machine members, and there are no limitations as to mounting the clutch with respect to the stationary machine members or housing. However, these devices have serious shortcomings because of the necessity of introducing fluid to rotating parts which requires, inter alia, rotating collectors or seals and rifle-drilling of the shafts. More specifically, seal velocity requirements are such that it is usually necessary to introduce and extract fluid at the internal diameter of the cylinder. In this situation, centrifugal force makes it difficult to extract the fluid and requires heavy release spring forces to expel the fluid, thereby reducing effective operating pressure.

Other prior art devices utilize a stationary cylinder and piston for operating the clutch members, which cylinder is mounted on an adjacent machine or transmission case and the piston then applies thrust to the rotating clutch through an antifriction bearing on which the piston is mounted. Therefore, these stationary cylinder devices do not have this centrifugal force problem in regard to the extraction of fluid and furthermore do not require expensive collectors or rotating fluid seals. As a result, the clutch can be mounted without regard to the above-mentioned fluid entry and exit problems. However, these latter prior art devices also have serious drawbacks, principally because of their lack of flexibility as to where they can be located in the transmission. As a result, these devices are not only large and complex, but also difficult and expensive to manufacture, particularly in machining the cylinder in the transmission housing, for example.

In an attempt to overcome the above shortcomings, it has also heretofore been proposed to utilize a clutch actuating mechanism consisting of a cylinder and piston assembly mounted concentrically with respect to the driving and driven members, which members are in co-axial alignment with one another, and in which the assembly is supported solely by one of the rotatable members. The present invention provides an improved clutch of this type.

In devices of this character it is highly important to make these clutch mechanisms as small and compact as possible, but with maximum capacity and stability of the mechanism. These requirements are particularly necessary in certain installations, such as, for example, in machine tools where many of these mechanisms may be employed in a single machine.

Accordingly, the present invention provides an improved clutch mechanism of the type above referred to, which mechanism is particularly compact both in axial and radial dimensions, stable and rugged in operation, and provides quick and positive release and low neutral drag in the unit.

More specifically, the mechanism provides a novel arrangement of the piston and clutch bearing which contributes materially to the compact design, and also provides novel uses for Belleville-type springs whereby not only positive disengagement of the clutch is insured but also undesirable rocking of the elements relative to one another is prevented, resulting in good stability of the mechanism.

These and other objects and advantages of the present invention will appear hereinafter as this disclosure progresses, reference being had to the accompanying drawings, in which:

FIGURE 1 is a side elevational view, partially in section, of a clutch mechanism made in accordance with the present invention; FIGURE 2 is a front elevational view and FIGURE 3 is a side elevational view in section of one of the Belleville-type springs.

For the purpose of illustrating a preferred form of the invention, various parts will be referred to as being a "drive" member or a "driven" member, but it is not intended to limit the invention to the exact form illustrated. Furthermore, the function of these parts may be reversed by reversing the direction in which power is transmitted through the mechanism and thus the "driven" member may become the "driving" member, and vice-versa.

Referring in greater detail to the drawings, a first rotatable member includes a flanged sleeve 1, adapted to be fixed to a driven shaft 2 by any suitable means such as the key 3. The sleeve has a radially extending shoulder 4 at one of its ends, and is externally splined for a major portion of its length, which portion is of a considerably smaller diameter than the shoulder 4. Other modifications of this first rotatable member may be utilized with the present invention, for example, the shoulder may be formed directly on a splined shaft and the sleeve thereby eliminated.

An axial pressure transmitting pressure plate 5 having a splined hub 6 is slidable by its internal splines on the splined portion of sleeve 1. An anti-friction radial bearing assembly 8 is mounted by its inner race 9 on the periphery of the hub 6, one side of the race 9 also abutting against the plate. The outer race 10 is located a considerable distance radially outwardly of the shoulder 4 and it will be noted that a space is provided between the shoulder and the radial bearing.

An anti-friction needle bearing ring assembly 12 is mounted on the radially extending shoulder and adjacent the outer edge thereof. This bearing ring assembly is firmly seated in an annular recess 13 formed in the shoulder, and it utilizes only a small axial distance, but presents a large thrust absorbing surface in a radial direction. The needle assembly not only contributes to an axially compact design and serves to absorb axial thrusts, but because of its location effectively acts to prevent wobbling of the cylinder as will appear later.

A cylinder and piston assembly A is non-rotatably mounted on the bearing assembly 8 and is supported entirely thereby in a radial direction. More particularly, the assembly includes a cylinder 15 having a radially inwardly extending annular flange 16 that extends between the needle ring assembly 12 and the bearing assembly 8. This flange 16 abuts against the bearing assembly 12 in thrust transmitting relationship. It will be noted that the inner wall of chamber 18 is considerably shorter in an axial direction than its outer wall, and flange 16 is located intermediate the axial length of the outer wall. The hub 6 extends axially within the overhanging portion of the outer wall, all of which contributes to an axially compact clutch.

A fluid inlet 17 serves to permit the ingress and egress of fluid, for example, oil, or the like, to and from the cylinder chamber 18. The cylinder and piston assembly A also includes a piston 20 which is reciprocable in the chamber. An inner sealing ring 21 and an outer sealing ring 22 act to form a fluid seal between the piston and the inner and outer walls, respectively, of the chamber. The piston is mounted directly on the outer race 10 of the bearing assembly 8 and thus the entire assembly A is supported in a radial direction solely on this bearing assembly.

It will be noted that the bearing assemblies 8 and 12 lie within the axial length of the cylinder and piston assembly 3 and that the piston is mounted directly on the bearing assembly 8 which in turn is mounted directly on the pressure plate 5. That is to say, the piston is mounted directly on the hub of the pressure plate and closely adjacent the shorter wall of the cylinder chamber and within the axial length of the longer cylinder chamber wall. Thus a portion of the inner wall of the cylinder has in effect been eliminated and the piston is mounted directly on the hub of the pressure plate, resulting in a radially compact design.

It should also be noted that the hub 6 and the inner race 9 lie radially within the needle bearing assembly 12.

Also slidably mounted on the splined portion of the sleeve 1 and for rotation therewith are a series of internally splined discs 30 which are held within a predetermined space by a back-up plate 31 that abuts against a snap ring 32 in the sleeve.

A driven member in the form of an annular cup 34 has a series of friction discs 35 held in its axially extending openings 36 for rotation therewith. One of these friction discs is located between adjacent discs 30 in the well-known manner. The driven member also includes a gear element 37 which is secured thereto by screws 38 or which may be formed integrally therewith.

Resilient means are provided between discs 30 and discs 35 for urging them apart, that is, to the released position. This means consists of Belleville-type springs 40 which in themselves are of conventional design, but which are used to particular advantage and a new use in a clutch mechanism made in accordance with the present invention. These annular springs are generally dished-shaped, flexible plates and have the physical characteristics of offering variable resistance to pressure applied thereto and of providing sufficient deformation by flexture before flattening to provide for movement of the discs. These springs therefore act to separate the discs for positive release of the clutch when fluid is permitted to leave the expansible chamber 18. They also act through the pressure plate and bearing assembly 8 to positively urge the piston to the retracted position for complete expulsion of fluid from the chamber and consequent substantial elimination of rotational creep or drag in the clutch mechanism. These Belleville-springs also perform a third and important function when used in a clutch made in accordance with the present invention, that is, together with the location of and in co-operation with the needle bearing assembly. These springs act to provide a stable clutch mechanism and one which will not "rock" or wobble in a transverse direction, even when in the released or neutral position, as will appear.

In order to engage the clutch elements and thereby transmit power through the mechanism, pressure fluid is admitted to the cylinder which causes the piston to move to the right (as viewed in FIGURE 1), and the resultant axial thrust is then transmitted through the bearing assembly 8, pressure plate 5 and presses the discs together and against the back-up plate 31. Power from the driven shaft 2 is thus transmitted to the gear 37 which then rotates with the shaft.

All of the forces are self-contained within the mechanism, the axial thrust of the cylinder being absorbed by flange 4 through the needle bearing assembly 12, and the axial thrust in the other direction being absorbed by the back-up plate 31.

When the clutch is to be disengaged, fluid is exhausted through opening 17 and the Belleville springs urge the discs apart and the piston to the retracted position, as previously mentioned, for complete release of the clutch. The Belleville springs also act to keep the various parts from rocking or wobbling, particularly when the clutch is in the release position by holding the cylinder flange 16 tightly against the needle assembly 12 and thus hold it in a stable and straight position. By locating the needle bearing assembly 12 a considerable distance radially inwardly of the piston, good stability is provided for the cylinder when it is urged against this assembly because the cylinder tends to rock about the seal 22 which acts as the pivot point for this tipping of the cylinder. The needle assembly 12, however, is located a considerable distance inwardly and at the outer end of a long moment arm formed by the cylinder. In other words, the needle assembly 12 is located at a considerable distance from the point 22 about which the cylinder tends to rock or tip, and thus acts with good leverage to straighten or "square-up" the cylinder in a transverse direction, in respect to the clutch axis, and against the thrust of the Belleville springs.

This co-operation between the Belleville springs and the needle assembly, and because of the location of the needle assembly relative to the point about which it tends to tip, results in a smoothly operating and rugged clutch mechanism.

The entire arrangement results in an integral and self-contained clutch mechanism which is compact in both radial and axial directions. The mechanism is stable and smooth in operation and yet capable of delivering maximum capacity for its size. The high capacity disc separator springs provides quick, positive release and low neutral drag as well as contributing to wobble-free operation of the parts. This compact, integral unit can be quickly and easily installed with no critical positioning problems. The non-rotating cylinder and piston assembly can utilize a simple hose connection with no rotating seals and no centrifugal head for fast operation at any rotational speed.

Various modes of carrying out the invention are contemplated as being within the scope of the following claims particularly pointing out and distinctly claiming the subject matter which is regarded as the invention.

I claim:

1. An integral and compact fluid pressure operated clutch comprising, a first rotatable member having an axial thrust shoulder and also having an exteriorly splined portion; a pressure plate including a hub axially slidable on said splined portion for rotation therewith; an anti-friction radial bearing mounted on the periphery of said hub and spaced axially from said shoulder; a non-rotatable cylinder and piston assembly including, a cylinder having a radially inwardly extending annular flange located between said bearing and shoulder, an axial thrust absorbing bearing between said flange and shoulder, a piston reciprocable in said cylinder and mounted on said radial bearing for sole support of said assembly thereby in a radial direction; a second rotatable member co-axially arranged in respect to said first rotatable member, axially shiftable and interengaging discs carried by said first and second rotatable members, and resilient means located between those discs carried by said first member and acting to: (1) urge said discs apart; (2) urge said piston toward a retracted position in said cylinder; and (3) urge said flange firmly against said axial thrust absorbing bearing and said shoulder to thereby prevent wobbling of said cylinder.

2. An integral and compact fluid pressure operated clutch comprising, a first rotatable member having an axial thrust shoulder and also having an exteriorly splined portion; a pressure plate including a hub axially slidable on said splined portion for rotation therewith; an anti-friction radial bearing mounted on the perpihery of said hub and spaced axially from said shoulder; a non-rotatable cylinder and piston assembly including, a cylinder having an outer wall and an axially shorter inner wall which terminates in a radially inwardly extending annular flange that is located between said bearing and shoulder, an axial thrust absorbing bearing between said flange and shoulder, a piston reciprocable in said cylinder and mounted on said radial bearing for sole support of said assembly thereby in a radial direction; a second rotatable member co-axially arranged in respect to said first rotatable member, axially shiftable and interengaging discs carried by said first and second rotatable members, and resilient means located between those discs carried by said first member and acting to: (1) urge said discs apart; (2) urge said piston toward a retracted position in said cylinder; and (3) urge said flange firmly against said axial thrust absorbing bearing and said shoulder, both of said bearings being located within the axial length of said cylinder and piston assembly.

3. An integral and compact fluid pressure operated clutch comprising, a first rotatable member having an axial thrust shoulder and also having an exteriorly splined portion; a pressure plate including a hub axially slidable on said splined portion for rotation therewith; an anti-friction radial bearing mounted on said hub and spaced axially from said shoulder; a non-rotatable cylinder and piston assembly including, a cylinder having an outer wall and a shorter inner wall and also having a radially inwardly extending annular flange located between said bearing and shoulder, a needle bearing between said flange and shoulder, a piston reciprocable in said cylinder and mounted on said radial bearing for sole support of said assembly thereby in a radial direction; a second rotatable member co-axially arranged in respect to said first rotatable member, axially shiftable and interengaging discs carried by said first and second rotatable members, and Belleville springs located between the discs carried by said sleeve and acting to: (1) urge said discs apart; (2) urge said piston toward a retracted position in said cylinder; and (3) urge said flange firmly against said axial thrust absorbing bearing and said shoulder, both of said bearings being located within the axial length of said cylinder and piston assembly.

4. An integral and compact fluid pressure operated clutch comprising, a sleeve adapted to be fixed to a driven shaft and having an axial thrust shoulder and an exteriorly splined portion; a pressure plate including a hub axially slidable on said splined portion for rotation therewith; an anti-friction radial bearing mounted on said hub and spaced axially from said shoulder; a non-rotatable cylinder and piston assembly including, a cylinder having a radially inwardly extending annular flange located between said bearing and shoulder, a needle bearing between said flange and shoulder, a piston reciprocable in said cylinder and mounted on said radial bearing for sole support of said assembly thereby in a radial direction; a rotatable member co-axially arranged in respect to said sleeve, axially shiftable and interengaging discs carried by the splined portion of said sleeve and said rotatable member, and Belleville springs located between the discs carried by said first member and acting to: (1) urge said discs apart; (2) urge said piston toward a retracted position in said cylinder; and (3) transmit axial thrust via said plate, radial bearing and piston and thereby urge said flange firmly against said needle bearing and said shoulder, both of said bearings being located within the axial length of said cylinder and piston assembly.

5. In a self-contained and compact fluid operated clutch having an axially movable pressure plate which is slidably splined on a rotatably driven member that has a radial shoulder, an anti-friction radial bearing mounted by its inner race on said pressure plate and axially spaced from said shoulder, a cylinder having a slidable piston therein, said piston being mounted on the outer race of said bearing so that the bearing forms the sole radial support for the cylinder and piston and is stacked radially therewith, said cylinder having a radial flange which extends inwardly between said shoulder and radial bearing, an axial thrust bearing between said shoulder and flange, and spring means acting on said pressure plate to cause it to act through said radial bearing and piston to thereby urge said cylinder flange against said axial thrust bearing for transverse stabilization by said shoulder.

6. In an integral and self-contained clutch having an axially movable pressure plate which is slidably splined on a rotatably driven member that has a radial shoulder, an anti-friction radial bearing mounted by its inner race on said pressure plate and axially spaced from said shoulder, a cylinder having an outer wall and an axially shorter inner wall which terminates in a radial flange that extends inwardly between said shoulder and radial bearing, a piston slidably mounted in said cylinder and having a portion that extends axially beyond said radial flange, by which portion it also is mounted on the outer race of said bearing so that the radial bearing forms the sole radial support for the cylinder and piston and is stacked radially therewith, an axial thrust bearing between said shoulder and flange, and spring means acting on said pressure plate to cause it to act through said radial bearing and piston to thereby urge said cylinder for transverse stabilization thereby, both of said bearings being located within the axial length of said cylinder.

7. In a self-contained and compact fluid operated clutch having an axially movable pressure plate which is slidably splined on a rotatably driven member that has a radial shoulder, an axial thrust absorbing needle bearing mounted on said shoulder, an anti-friction radial bearing mounted by its inner race on said pressure plate and axially spaced from said needle bearing, a cylinder having a piston which is slidably mounted therein and is also fixedly mounted on the outer race of said bearing so that the bearing forms the sole radial support for the cylinder and piston and is stacked radially therewith, said cylinder having a radial flange which extends inwardly between said needle bearing and radial bearing, and spring means acting on said pressure plate to cause it to act through said radial bearing and piston to thereby urge said cylinder against said needle bearing for transverse stabilization by said shoulder.

8. An integral and compact fluid operated clutch having an axially movable pressure plate which is slidably splined on a rotatably driven member that has a radial shoulder, an anti-friction radial bearing mounted by its inner race on said pressure plate and axially spaced from said shoulder, a cylinder having a slidable piston therein, said piston being mounted on the outer race of said bearing so that the bearing forms the sole radial support for the cylinder and piston and is stacked radially therewith, said cylinder having a radial flange which extends inwardly between said shoulder and radial bearing, an axial thrust bearing between said shoulder and flange, a second rotatable member co-axially arranged in respect to said driven member, interengaging discs carried by said driven member and said second rotatable member and axially shiftable by said pressure plate, and spring means between said discs and acting to urge them apart and also urging said pressure plate to cause it to act through said radial bearing and piston to thereby urge said cylinder against said axial thrust bearing for transverse stabilization by said shoulder.

References Cited in the file of this patent

UNITED STATES PATENTS

| | | |
|---|---|---|
| 1,864,126 | Ferris | June 21, 1932 |
| 2,587,230 | Schaad | Feb. 26, 1952 |
| 2,738,864 | Becker | Mar. 20, 1956 |

FOREIGN PATENTS

| | | |
|---|---|---|
| 130,830 | Sweden | Feb. 13, 1951 |